Patented Apr. 1, 1947

2,418,211

UNITED STATES PATENT OFFICE 2,418,211

METHOD OF MAKING CELLULAR CELLULOSE DERIVATIVES

John Guilfoyle Williams, London, England, assignor to British Celanese Limited, London, England, a company of Great Britain No Drawing. Application December 9, 1943, Serial No. 513,625. In Great Britain December 14, 1942

6 Claims. (Cl. 106—122)

This invention relates to colloids, and in particular to the production of tough, cellular materials from cellulose acetate or other synthetic organic colloids.

I have found that materials of the kind referred to can be made by forming from the colloid a gel in which the liquid constituent consists substantially of a non-solvent for the colloid, and effecting evaporation of said non-solvent at a temperature insufficiently high to lead to collapse of the gel-structure. Preferably the colloid is first formed into a gel containing a solvent as well as a non-solvent and this is then washed in a body of non-solvent liquid to replace solvent by non-solvent. The gel may be made by the addition of non-solvent to a solution of the colloid in a mixture containing a non-solvent and a solvent for the colloid.

One method of carrying out the invention is as follows:

About 100 parts by weight of cellulose actate is dissolved in a mixture of the following composition:

| | Parts |
|---|---|
| Ethanol | 130 |
| Benzene | 130 |
| Acetone | 500 | the parts being by weight. Benzene is then slowly added to the solution until a coherent gel is formed. This is pressed lightly between cheese cloth or the like into the form of a slab, and immersed while enclosed in the cloth in a bath of benzene for 24 hours, during which time the benzene is renewed 3 times. In this way ethanol and acetone in the gel are replaced by benzene. The gel is then removed from the bath and allowed to dry at room temperature. The product is a rigid, tough slab of cellular material having a specific gravity of about 0.4. The gel can be shaped or moulded cold to some extent before washing, but care must of course be taken if its structure is not to be damaged. The dried material can be sawn and planed, and is resistant to crushing. A sample placed in water remained floating after one week, and the buoyancy can be maintained almost indefinitely by sealing the pores on the surface as described below.

Instead of acetone, other solvents for cellulose acetate can be employed, for example dioxane, methylene ethylene ether, or acetic acid. Ethanol may be replaced by methanol or a higher alcohol, for example isopropanol. A number of non-solvents other than benzene, is available, for example other liquid hydrocarbons such as toluene, and aliphatic ethers such as methyl ethyl ether and diethyl ether. Water can also be employed. The non-solvent should be miscible with the solvent and sufficiently volatile to be removed in a reasonable time by evaporation at ordinary temperatures, or temperatures slightly above normal, for example 30–40° C. Thus it is preferable to employ as the non-solvent a liquid which at 20° C. has a vapour pressure at least as high as water at the same temperature, and liquids of considerably higher volatility can be used with advantage. The best results have been obtained using a non-solvent such as benzene or toluene having some affinity for or swelling action on the cellulose acetate. It is not essential to use the same non-solvent for soaking the initial gel as is contained in the solution from which that gel is formed. Thus for instance, the soaking can be effected in an aqueous bath even though the gel be formed from a solution such as is referred to above, containing acetone, ethanol and benzene.

Other methods of forming gels containing a non-solvent for the cellulose acetate or other colloid are available. One of such methods is to dissolve the cellulose acetate in a mixture of solvent and non-solvent in which the colloid is soluble at elevated temperatures but not at ordinary temperatures, and then to cool the solution to ordinary temperatures. Mixtures such as that referred to above, containing acetone or other active solvent, together with one or more non-solvents such as benzene and alcohol, may be used in this method of gel formation. It is not essential when this method is adopted, to have an active solvent present in the solution of the cellulose acetate or other colloid. The colloid may for example, be dissolved in a non-solvent liquid or mixture of non-solvent liquids, which becomes a solvent at elevated temperatures. In the case of the ordinary acetone-soluble cellulose acetate of commerce for example, such non-solvents and mixtures include cyclohexanol, the monomethyl cyclohexanols, aqueous methanol or ethanol of about 80% concentration, and mixtures of alcohols with aromatic hydrocarbons such as benzene, with higher chlorinated aliphatic hydrocarbons such as propylene chloride, and non-solvent ketones and esters, e. g. methyl ethyl ketone and ethyl acetate.

The gels may contain plasticisers for the colloid. In the case of cellulose acetate and colloids of like constitution, a large number of plasticisers is available, among which are: triacetin, dimethyl phthalate, diethyl phthalate, di-(methoxy ethyl)

phthalate, di-(ethoxy ethyl) phthalate, methyl phthalyl ethyl glycolate, ethyl phthalyl ethyl glycolate, diethyl tartrate, tri-(monochlor ethyl) phosphate, and para-toluene-sulphonamide. These are all solvent plasticisers for cellulose acetate. They may be employed alone, or in admixture with plasticisers having little or no affinity for cellulose acetate, for example, triphenyl phosphate or tricresyl phosphate. By the use of solvent plasticisers in conjunction with the colloid, gels can be formed without the use of volatile true solvents. For instance cellulose acetate together with about 30% of dimethyl phthalate or triacetin, can be dissolved at about 80° C. in about twice its weight of 75% aqueous ethanol and precipitated therefrom in the form of a gel by cooling the solution. The proportion of non-solvent to plasticiser when adopting this method is important. Thus when the ratio of non-solvent to plasticiser is increased, first granular precipitates are obtained such as are described in U. S. application S. No. 521,644, filed February 7, 1944, and a further increase leads to insolubility even at the elevated temperature.

It has been stated above that removal of the non-solvent from the gel by evaporation should be effected at relatively low temperatures. The reason for this precaution is to avoid shrinkage or collapse of the gel which occurs if the non-solvent be removed at temperatures sufficiently high for plastic flow of the colloid to occur. The temperature beyond which such flow may occur depends on the nature of the particular colloid involved, as well as on the affinity of other substances present for the colloid. Thus the presence of plasticisers and solvents lowers the temperature at which flow and shrinkage occur. Naturally, with a view to accelerating the removal of the non-solvent, it is desirable to work at as high a temperature as can be done without such flow occurring. Evaporation may with advantage be carried out under reduced pressure or by subjecting the gel to a current of warm, dry air.

The invention has been described with particular reference to the use of cellulose acetate as the colloid. Other colloids that can be employed include other esters of cellulose, for example, cellulose nitrate, cellulose propionate, cellulose butyrate, cellulose acetate-propionate, cellulose acetate-butyrate, cellulose acetate-stearate, cellulose acetate-laurate, cellulose acetate-nitrate; ethers of cellulose, for example methyl cellulose, ethyl celluose, benzyl cellulose, ethylhexyl cellulose; ether-esters of cellulose, for example ethyl cellulose acetate; and polymerised unsaturated substances such as polyvinyl acetate, polyvinyl chloride-acetate, formals, acetals, butyrals and other acetal derivatives of polyvinyl alcohol or partially saponified polyvinyl esters, polyacrylic acid, polyethyl acrylate, polymethyl methacrylate, polystyrene and co-polymers of two or more of such unsaturated compounds. The choice of suitable solvent and non-solvent liquids for such colloids depends, of course, on the nature of the particular colloid in question.

When the colloid is a saponifiable substance, for example, a fatty acid ester of cellulose, the invention includes subjecting the cellular material of the saponifiable colloid to a saponifying treatment. Thus, for example, the cellular materials referred to above, having a basis of cellulose acetate, may be subjected to alkaline saponifying baths, for example aqueous caustic soda solutions of concentration between 0.05% and 5 or 6% or even higher. The baths may contain wetting agents or penetrating agents so long as the conditions are not such as to damage the structure of the material. From this point of view such saponifying baths as alcoholic solutions of mineral bases or aqueous solutions of organic bases having a swelling action on the cellulose ester, for example, methylamine, ethylene diamine and like nitrogenous bases must be used with caution. Gaseous saponifying agents such as ammonia may be employed in the presence of water vapour. The saponification may be superficial or deep-seated.

The products of the invention are of considerable utility on account of their low specific gravity combined with toughness and rigidity and resistance to crushing. Thus in the products of the invention the specific gravity is commonly between about 30 and about 50% or 60% that of the colloid itself, and samples have resisted crushing under loads as high as 500 lbs. per square inch. The products of the invention may be employed as heat insulating material, for instance, as heat insulating mats, panels, walls of refrigerators, and as heat and sound insulating panels and boards in building construction. They are also useful by virtue of their buoyancy, for instance in the construction of floats, rafts, pontoons, lifeboats and other craft. A further use is as material for sealing rings, gaskets, washers and the like. The porous structure of the material enables it to be impregnated with liquids. Thus the sealing members referred to above can be impregnated with fluids adapted to assist sealing, e. g. oils, glycerine, glycols and the like. The materials of the invention can be used to form bearing surfaces where a substantial rise in temperature is unlikely to occur, for instance in the case of shafts rotating under or in contact with water. They are also of value in the construction of structural components having a high ratio of rigidity to specific gravity from thin, strong, flexible members, for instance of steel or other metal, spaced apart by a material of high compressive strength and low specific gravity.

The cellular materials of the invention may be treated in such a way as to seal the pores on the surface. One way of doing this is by the application of coating compositions containing a lacquer base and a volatile solvent therefor with or without a filler. The composition should not, of course, penetrate to any substantial depth below the surface of the material and for this reason it is desirable to use highly viscous compositions. The volatile solvent of the composition is for the same reason preferably a non-solvent for the colloid of the material, although with care the desired object can be achieved even by the use of compositions containing a solvent for the colloid. As the lacquer base any of the synthetic organic colloids referred to above may be used. Other lacquer bases that can be employed include natural resins. Compositions having a basis of linseed oil or other drying oil can also be used. The composition may be spread or brushed onto the surface of the material and allowed to dry. Further coatings of the same or different composition may then be applied. The cellular material may also be surfaced with a pre-formed film or foil, for instance of one of the colloids referred to above, caused to adhere to the material by light pressure after careful application to one or both of the surfaces to be united, of a volatile solvent or a cement containing a volatile solvent. The surface of the cellular material may be given a Having described my invention, what I desire to secure by Letters Patent is:

1. Process for the production of a cellular material from an organic derivative of cellulose, which comprises forming an organic derivative of cellulose, selected from the group consisting of cellulose esters and cellulose ethers, into a gel containing a solvent therefor, transferring the gel to a liquid bath that is a non-solvent for the organic derivative of cellulose but is miscible with said solvent to replace the solvent with said non-solvent liquid, and then effecting evaporation of said non-solvent liquid at a temperature insufficiently high to lead to collapse of the gel-structure.

2. Process for the production of a cellular material from cellulose acetate, which comprises forming the cellulose acetate into a gel containing a solvent therefor, transferring the gel to a liquid bath that is a non-solvent for the cellulose acetate but is miscible with said solvent to replace the solvent with said non-solvent liquid, and then effecting evaporation of said non-solvent liquid at a temperature insufficiently high to lead to collapse of the gel-structure.

3. Process for the production of a cellular material from an organic derivative of cellulose, which comprises forming an organic derivative of cellulose, selected from the group consisting of cellulose esters and cellulose ethers, into a gel containing a solvent therefor, transferring the gel to a liquid bath that is a non-solvent for the organic derivative of cellulose but is miscible with said solvent to replace the solvent with said non-solvent liquid, which non-solvent liquid has a vapor pressure at 20° C. that is at least as high as that of water at 20° C., and then effecting evaporation of said non-solvent liquid at a temperature insufficiently high to lead to collapse of the gel-structure.

4. Process for the production of a cellular material from cellulose acetate, which comprises forming the cellulose acetate into a gel containing a solvent therefor, transferring the gel to a liquid bath that is a non-solvent for the cellulose acetate but is miscible with said solvent to replace the solvent with said non-solvent liquid, which non-solvent liquid has a vapor pressure at 20° C. that is at least as high as that of water at 20° C., and then effecting evaporation of said non-solvent liquid at a temperature insufficiently high to lead to collapse of the gel-structure.

5. Process for the production of a cellular material from cellulose acetate, which comprises forming the cellulose acetate into a gel containing a solvent therefor comprising acetone, benzene and ethanol, transferring the gel to a liquid bath comprising benzene that is a non-solvent for the cellulose acetate to replace the acetone and ethanol with benzene, and then effecting evaporation of said benzene at a temperature insufficiently high to lead to collapse of the gel-structure.

6. Process for the production of a cellular material from cellulose acetate, which comprises forming the cellulose acetate into a gel containing a solvent therefor comprising acetone, benzene and ethanol, transferring the gel to a liquid bath comprising water that is a non-solvent for the cellulose acetate to replace the acetone and ethanol with water, and then effecting evaporation of said water and the retained benzene at a temperature insufficiently high to lead to collapse of the gel-structure.

JOHN GUILFOYLE WILLIAMS.

REFERENCES CITED

The following references are of record in the file of this patent:

UNITED STATES PATENTS

| Number | Name | Date |
| --- | --- | --- |
| 2,319,054 | Fordyce et al. (1) | May 11, 1943 |
| 2,319,052 | Fordyce et al. (2) | May 11, 1943 |
| 2,319,051 | Fordyce et al. (3) | May 11, 1943 |
| 2,027,688 | Hagedorn | Jan. 14, 1936 |
| 1,991,115 | Northrup et al. | Feb. 12, 1935 |
| 1,906,041 | Barthelemy | Apr. 25, 1933 |

FOREIGN PATENTS

| Number | Country | Date |
| --- | --- | --- |
| 528,375 | British | Oct. 28, 1940 |
| 365,526 | British | Jan. 15, 1932 |